3,202,711
N-SUBSTITUTED PHENALKYL AMINES

Wolfgang Fruhstorfer, Georg Seitz, and Karl Schulte, Darmstadt, and Heinrich Müller, Pfungstadt, Germany, assignors to E. Merck Aktiengesellschaft, Darmstadt, Germany
No Drawing. Filed June 19, 1963, Ser. No. 288,874
Claims priority, application Germany, June 19, 1962, M 53,252; June 26, 1962, M 53,338
14 Claims. (Cl. 260—570)

This invention relates to the preparation of novel substituted amines.

The principal object of the invention is to provide novel substituted amines as well as the acid addition salts thereof.

Another object is to provide processes for the production of the novel compounds of this invention.

A further object is to provide pharmaceutical compositions based on the novel amines and salts thereof.

A still further object is to provide methods of effecting pharmacological activities in mammals by administering the novel compounds of this invention.

Other objects and advantages of this invention will become apparent upon further study of the specification and appended claims.

The novel compounds of this invention conform to substituted amines of the Formula I, as follows:

$$X-(CH_2)_n-\underset{R_1}{\underset{|}{C}H}-N-\underset{R_4}{\underset{|}{(Y)_m}}-C\underset{R_3}{\overset{R_2}{\underset{|}{H}}}$$

and the acid addition salts thereof, wherein
$R_1$ is hydrogen, methyl or ethyl;
$R_2$ is hydrogen, phenyl or X;
$R_3$ is phenoxy or $R_2$;
$R_4$ is hydrogen, alkyl of 1–4 carbon atoms or hydroxyalkyl of 1–4 carbon atoms;
X is a substituted phenyl radical of the formula:

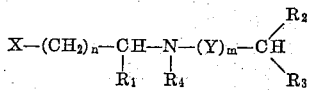

$R_5$ is a tertiary alkyl group of 4–6 carbon atoms;
$R_6$ is hydrogen or a tertiary alkyl group of 4–6 carbon atoms;
$R_7$ and $R_8$ are each hydrogen or a primary alkyl of 1–4 carbon atoms;
$R_9$ is hydrogen or hydroxy, with the provision that when $R_9$ is hydroxy it is in other than the 2- or 6-position, and at least one of $R_6$, $R_7$ and $R_8$ is other than hydrogen;
Y is an alkylene group of 1–3 carbon atoms;
m is an integer from 0 to 1 inclusive; and
n is an integer from 1 to 3 inclusive; with the provision that the group $(CH_2)_n$—$CHR_1$, contains less than 5 carbon atoms in total.

The tertiary alkyl group of the compounds of this invention is preferably a tertiary butyl group.

The radical X is preferably a member of the group consisting of 2,6-dimethyl-3-hydroxy-4-tert.butyl-phenyl; 2,6-dimethyl - 4-tert.butyl-phenyl; 3-tert.butyl-4-hydroxy-5-methyl-phenyl; 3,5-ditert.butyl-4-hydroxy-phenyl and 2-methyl-3-hydroxy-4-tert.butyl-phenyl.

Preferred sub-generic embodiments of the compounds of this invention are:

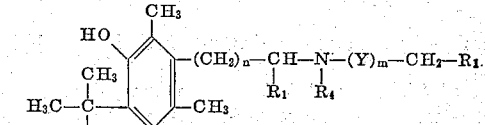

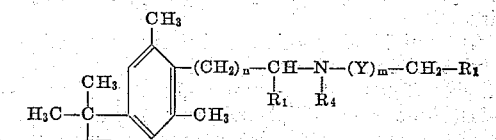

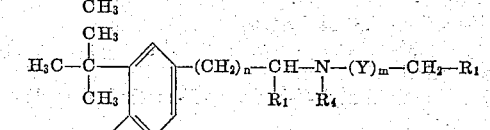

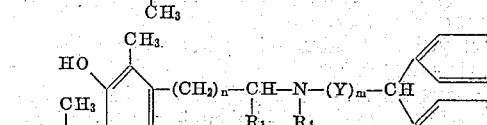

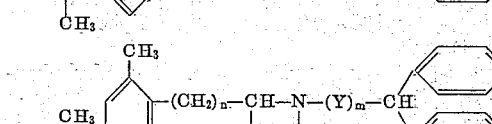

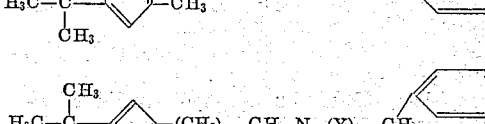

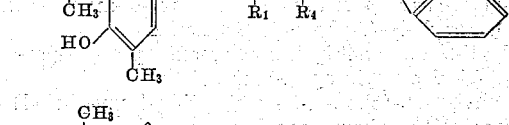

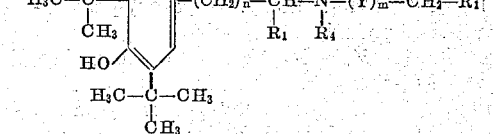

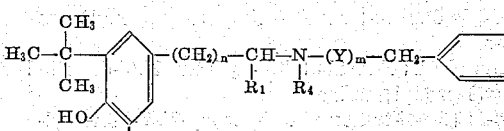

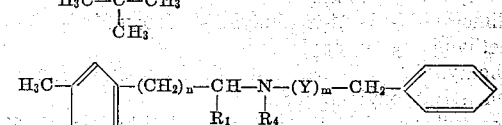

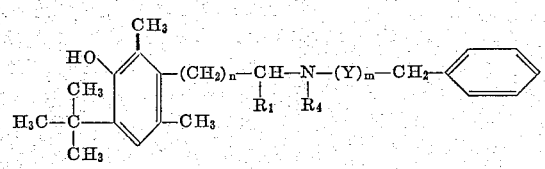

Typical specific examples of the compounds of this invention in addition to those mentioned in the examples are:

3-tert.butyl-4-hydroxy-N,N,5-trimethyl-phenethylamine
N-ethyl-3-tert.butyl-4-hydroxy-N,5-dimethyl-phenethyl-amine
N,N-diethyl-3-tert.butyl-4-hydroxy-5-methyl-phenethylamine
3-tert.butyl-4-hydroxy-N,5-dimethyl-phenethylamine
N-ethyl-3-tert.butyl-4-hydroxy-5-methyl-phenethylamine
3-tert.butyl-4-hydroxy-5-methyl-N-isopropylphenethylamine
N-(3-tert.butyl-4-hydroxy-5-methyl-phenethyl)-N-(1'-methyl-3',3'-diphenyl-propyl)-amine
N-methyl-N-(3-tert.butyl-4-hydroxy-5-methyl-phenethyl)-N-(1'-methyl-3',3'diphenyl-propyl)-amine
N-ethyl-N-(3-tert.butyl-4-hydroxy-5-methyl-phenethyl)-N-(1'-methyl-3',3'-diphenyl-propyl)-amine
N-methyl-3-(3'-tert.butyl-4'-hydroxy-5'-methyl-phenyl)-propylamine
N-ethyl-3-(3'-tert.butyl-4'-hydroxy-5'-methyl-phenyl)-propylamine
N-isopropyl-3-(3'-tert.butyl-4'-hydroxy-5'-methylphenyl)-propylamine
N,N-diethyl-3-(3'-tert.butyl-4'-hydroxy-5'-methyl-phenyl)-propylamine
N-[3-(3'-tert.butyl-4'-hydroxy-5'-methyl-phenyl)-propyl]-N-(1''-methyl-3'',3''-diphenyl-propyl)-amine
N-methyl-N-[3-(3'-tert.butyl-4'-hydroxy-5'-methyl-phenyl)-propyl]-N-(1''-methyl-3'',3''-diphenyl-propyl)-amine
N-ethyl-N-[3-(3'-tert.butyl-4'-hydroxy-5'-methyl-phenyl)-propyl]-N-(1''-methyl-3'',3''-diphenyl-propyl)-amine
N-methyl-N-[3-(3'-tert.butyl-4'-hydroxy-5'-methyl-phenyl)-propyl]-N-(3-phenylpropyl)-amine
N-ethyl-N-[3-(3'-tert.butyl-4'-hydroxy-5'-methyl-phenyl)-propyl]-N-(3-phenylpropyl)-amine
N-n-propyl-N-[3-(3'-tert.butyl-4'-hydroxy-5'-methyl-phenyl)-propyl]-N-(3-phenylpropyl)-amine
N-n-butyl-N-[3-(3'-tert.butyl-4'-hydroxy-5'-methyl-phenyl)-propyl]-N-(3-phenylpropyl)amine
N-[3-(3'-tert.butyl-4'-hydroxy-5'-methyl-phenyl)-propyl]-N-(3-phenylpropyl)-amine
N-methyl-N-[3-(3',5',-di-tert.butyl-4'-hydroxy-phenyl)-propyl]-N-(3-phenylpropyl)-amine
N-ethyl-N-[3-(3',5'-di-tert.butyl-4'-hydroxy-phenyl)-propyl]-N-(3-phenylpropyl)-amine
N-n-propyl-N-[3-(3',5'-di-tert.butyl-4'-hydroxy-phenyl)-propyl]-N-(3-phenylpropyl)-amine
N-n-butyl-N-[3-(3',5'-di-tert.butyl-4'-hydroxy-phenyl)-propyl]-N-(3-phenylpropyl)-amine
N,N-bis-[3-(3',5'-di-tert.butyl-4'-hydroxy-phenyl)-propyl]-amine
N-methyl-N-[3-(4'-tert.butyl-3'-hydroxy-2',6'-dimethyl-phenyl)-propyl]-amine
N-ethyl-N-[3-(4'-tert.butyl-3'-hydroxy-2',6'-dimethyl-phenyl)-propyl]-amine
N,N-dimethyl-N-[3-(4'-tert.butyl-3'-hydroxy-2',6'-dimethylphenyl)-propyl]-amine
N,N-diethyl-N-[3-(4'-tert.butyl-3'-hydroxy-2',6'-dimethyl-phenyl)-propyl]-amine
N-(3-phenylpropyl)-N-[3-(4'-tert.butyl-3'-hydroxy-2',6'-dimethyl-phenyl)-propyl]-amine
N-methyl-N-(3-phenylpropyl)-N-[3-(4'-tert.butyl-3'-hydroxy-2'-6'-dimethyl-phenyl)-propyl]-amine The new compounds can be produced by any one of the following processes:

(a) Introducing by conventional substitution or addition reactions:

(1) The group

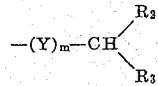

into an amine of the Formula II as follows:

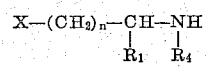 (II)

(2) The group

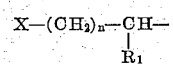

into an amine of the Formula III as follows:

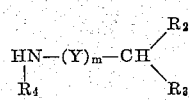 (III)

(3) The Group $R_4$ into an amine of the Formula IV as follows:

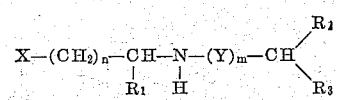 (IV)

wherein $R_1$ to $R_4$, X, Y, m and n have the previously indicated meanings.

(b) By treating with reducing agents a compound having the general structure of Formula I and containing hydrogenolytically removable moieties, or a C=N— group, or one or more non-aromatic C=C double bonds;

(c) From a compound having the general structure of Formula I but with a functionally altered hydroxy or amino group, by liberating the hydroxy or amino group, or by converting an amino group into a hydroxyl group by diazotizing and boiling;

(d) From a tertiary amine of Formula I by treatment with an acid to convert the amine into a physiologically compatible acid addition salt, or conversely, from an acid addition salt of a base of Formula I by liberating the amine therefrom.

These processes are set forth in more detail as follows:

(a) By suitable substitution or addition reactions an amine of Formula II can have added to it the group

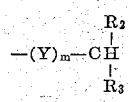

or an amine of Formula III can have added to it the group

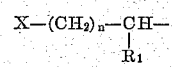

or an amine of Formula IV can have added to it the group $R_4$, where $R_1$ to $R_4$, X, Y, m and n have the meanings above indicated.

For example, an amine of Formula II can be reacted with a compound of Formula V

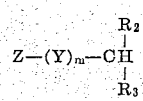 (V)

or an amine of Formula III can be reacted with a compound of Formula VI

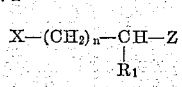 (VI)

or an amine of Formula IV can be reacted with a compound of Formula VII

 (VII)

wherein Z represents a group which can be replaced by an amino group, and preferably the acid residue of an inorganic acid as for example HCl, HBr, HI, H₂SO₄, H₃PO₄ or an organic sulfonic acid as for example p-toluene sulfonic acid; or a hydroxy; acyloxy; or a secondary or tertiary amino group.

If the chosen reaction component is an ester of one of the above mentioned acids, as for example, a halide, a dialkyl sulfate or a p-toluene sulfonic acid ester, the reaction can be performed either in the presence or in the absence of a solvent. As examples of solvents, the lower aliphatic alcohols, benzene, toluene and xylene are to be considered. Depending on which ester is used as the starting material, the work is done at low temperature, at room temperature, or at the boiling temperature of the solvent that is used. In certain cases it may be necessary to perform the reaction under pressure or at elevated temperatures. The amines of Formulas II, III and IV can be used in excess, but it can also be advantageous to perform the reaction in the presence of an acid-binding medium as, for example, an alkaline earth hydroxide or carbonate, or an organic amine that can be alkylated, if at all, only with difficulty. Obviously the reaction conditions must be so chosen that there will not be a simultaneous etherization of phenolic hydroxyl groups.

If an alcohol (Z—OH) is used, as the starting material, or if preferred a carboxylic acid ester residue of such an alcohol, the reaction with an amine of Formula II, III, or IV is preferably performed in the presence of a catalyst. As suitable catalysts, consideration can be given to dehydration or dehydrogenation catalysts or mixtures thereof, as for example, aluminum oxide or Raney nickel or noble metal catalysts such as palladium oxide or palladium charcoal.

As a starting material, use can also be made of a compound of Formula V, VI or VII where Z represents a secondary or tertiary amino group. Such an amino group under reaction conditions will react to bring about a reamination with an amine of Formula II, III, or IV. The reaction conditions for such a reamination are the usual ones. The amine of Formula II, III, or IV is preferably used in large excess and the work is done in the presence of catalysts such as acids, metal salts, iodine, dehydrating contact catalysts, hydrogenation-dehydrogenation catalysts, or sodium hydrogen sulfide. In certain cases such reamination will occur without the use of catalysts. It is advantageous to perform the reactions in the presence of an inert solvent, as for example, benzene, under increased pressure and at higher temperature.

In Formulas V, VI and VII the substitution for the residue Z can undoubtedly be accomplished by any of the usual methods of substitution described in Houben Weyl's "Methoden der organischen Chemie," 4th Edition published by Georg Thieme, Stuttgart, 1957, vol. XI/1, pages 24 to 267.

Finally the above mentioned residues can also be introduced into the amines of Formulas II, III and IV by a suitable addition reaction. As a suitable material for this purpose, use can be made of an unsaturated compound of Formula VIII

(VIII)

where $Y_1$ is a straight chain or branched chain alkene residue with 1 to 3 carbon atoms, or an olefin with 2 to 4 carbon atoms, which may be substituted by an OH group, or a compound of Formula IX $$X—R_{10} \qquad (IX)$$

where $R_{10}$ is a straight chain or branched chain alkene residue with 1 to 4 carbon atoms. To the double bond of such an unsaturated compound an amine of Formula II, III or IV can be added. Such addition reactions are described on pages 267–270 of the Houben Weyl book cited above. The work is preferably done under increased pressure (up to about 300 atm.) and at elevated temperature (up to about 300° C.). In this reaction it is advantageous to use a catalyst such as a cobalt or molybdenum catalyst or an alkali metal such as sodium and to use the secondary amine of Formula II, III or IV in excess.

The hydroxyalkyl groups are also best introduced by a conventional addition reaction. An amine of Formula III may be reacted with an alkylene oxide, preferably ethylene oxide, in the presence of a small amount of water. An inert solvent as for example, benzene or toluene may be added. The reaction mixture is either allowed to stand several hours at room temperature or is warmed a shorter or longer time up to 250° C. The reaction can also be performed under pressures up to 200 atm.

(b) according to this invention a substituted amine of Formula I can also be produced from a compound with the general structure of Formula I and which has one or more hydrogenolytically removable moieties. The conversion of such a substance into an amine of Formula I is effected by the usual hydrogenolysis. As hydrogenolytically removable moieties, the following are to be considered: halogen, diazonium, benzyl, substituted benzyl, oxygen attached to nitrogen, or an arylsulfonyl nitroso or amino group attached to an amino group. Further examples of hydrogenolytically removable residues are hydroxy groups, esterified or etherized hydroxy groups, amino groups, or alkylated amino groups, provided these groups are next to a phenyl residue and/or next to the nitrogen atom of the amine that was used as starting material for the hydrogenolysis.

The hydrogenolysis can be accomplished by treatment of the starting materials with catalytically activated hydrogen. As catalysts, the usual ones, as for example, the noble metal catalysts, but also Raney nickel and Raney cobalt can be employed. These catalysts can be used, for example, as oxide catalysts, as carrier catalysts, for example, palladium animal charcoal, or as finely divided metal catalysts, as for example, platinum black. The work is preferably done under increased pressure and elevated temperature. It is also advantageous to perform the reaction in the presence of an inert solvent, as for example, ethanol.

If an amine salt is used as the starting material, the hydrogenolysis can be effected in an aqueous medium.

A starting compound of the general structure of Formula I which contains an amino group as the hydrogenolytically removable group is obtained in all cases in which a nitrile is reacted with an amine. If the reaction is performed in the presence of catalytically activated hydrogen, the resulting amino group can be removed in a simple manner.

The secondary amine of Formula II, III or IV that is used as a reaction component is used in excess. During this reaction the nitrogen atom of the nitrile probably first forms an imino group, which is then converted into an amino group by the catalytically activated hydrogen, to be hydrogenolytically split off. The reaction is preferably performed under pressure and at elevated temperature. Any of the usual catalysts can be used, as for example, noble metal catalysts, Raney nickel catalysts or Raney cobalt.

If the starting material is a compound of the general structure of Formula I and containing a halogen atom, then the latter can be removed, not only by treatment with catalytically activated hydrogen, but also by the action of a complex metal hydride such as lithium aluminum tetrahydride, sodium boron tetrahydride, or aluminum boron hydride. Such a dehalogenation can also be performed by treatment with sodium in alcohol, magnesium in alcohol, or nickel aluminum alloy in aqueous alkali.

The same method is also suitable for the hydrogenolytic removal of hydroxyl groups which are in the alpha position to a phenyl nucleus.

It is also possible to use as the starting material a substance having the general structure of Formula I, and which preferably carries on the aromatic nucleus a diazonium group which under the usual deaminizing conditions can be substituted by a hydroxyl group, as for example, in the presence of ethanol or acetone, or in aqueous solution with a large excess of hypophosphoric acid, or with sodium stannite, zinc stannite in alcohol, or alkaline formaldehyde solution.

The starting substance can also be a substituted amine of Formula I which carries a hydroxyl group as the hydrogenolytically removable residue. It is possible to produce such a compound and to effect hydrogenolytic removal of the hydroxyl group in a single operation by attaching to an amine of Formula II, III or IV the above mentioned moieties under conditions favorable for reductive alkylation. The amine is thus reacted with a similarly substituted aldehyde or ketone. The hydroxyl group which was first produced in this reaction by the separation of ammonia is then separated by the catalytically activated hydrogen in the same reaction. Such reductive alkylations are advantageously performed in the presence of a suitable catalyst, for which purpose the usual catalysts, as for example, the noble metal catalysts, but also Raney nickel or Raney cobalt are to be considered, and may be used in the form of oxide catalysts, carrier catalysts, or finely divided metal catalysts. The work is preferably done under elevated hydrogen pressure (up to 200 atm.) and at elevated temperature (up to 250° C).

Such a reductive alkylation can also be performed with chemical reducing agents. Instead of the catalytically activated hydrogen, compounds, as for example, formic acid, formamide or ammonium formate may be used. This known method of Leuckart-Wallach is set forth in detail in Houben-Weyl, "Methoden der organischen Chemie," 4th edition, published by Georg Thieme, Stuttgart 1958, vol. XI/1, pages 648-664.

If as a starting material, use is made of a compound having the general structure of Formula I whose amino group is functionally altered by an aryl sulfonic residue, then this residue can be split off by reducing agents as by treatment of the starting material with an alkali metal in a lower aliphatic alcohol. A similar reductive splitting can also be effected by treatment of the acyl amine with an alkali metal in liquid ammonia or in an amine such as ethyl-, methyl-, or diethylamine. The reaction mixture is worked up in the usual manner, as for example, by treatment of the resulting product with ammonium chloride. After removal of the ammonia or the amine, the residue is taken up with water and is extracted with a solvent such as ether or chloroform.

The starting material of this invention can also be a compound of the general structure of Formula I, but which contains a C=N-group or one or more non-aromatic C=C double bonds. By catalytic hydrogenation of such an unsaturated compound under the usual conditions, the desired substituted amine of Formula I will be obtained. Suitable for use as hydrogenation catalysts are, for example, the noble metal catalysts or Raney nickel or Raney cobalt. For such hydrogenations, the conditions should not be too severe, or else the aromatic double bonds may be attacked. The reaction temperatures should therefore not be too high. The work is preferably done at room temperature and in the presence of an inert solvent, as for example, a lower aliphatic alcohol such as methanol or ethanol. If an amine salt is used as the starting material, the reaction can then be performed in an aqueous solution.

If the starting material is a compound with the general structure of Formula I but with a C=N-group, the reduction can be accomplished not only by catalytic hydrogenation but also by treatment with a complex metal hydride, as for example, lithium aluminum hydride, sodium borohydride or aluminum borohydride. The work is preferably done in the presence of an inert solvent, but can also be done in the presence of water. To complete the reaction, the temperature is preferably raised to the boiling point of the solvent.

The reduction of a compound having the general structure of Formula I but containing a C=N-group can also be accomplished by nascent hydrogen which can be produced by treatment of metals with acids or bases, as for example, zinc with acid or alkali hydroxide, iron with hydrochloric acid, or stannous chloride with hydrochloric acid. Sodium or some other alkali metal in alcohol can also be used as the reducing agent. An aluminum-nickel alloy in an aqueous alkali solution, with the possible addition of alcohol, can also be used, or also aluminum amalgam in ether-water solution. With these reactions the work is preferably done in the presence of a solvent such as glacial acetic acid, benzene, toluene or water. The reaction can also be carried out in a heterogeneous phase, although increased pressure is generally not necessary. The reaction temperatures can be anywhere between room temperature and the boiling point of the solvent, the reaction being preferably completed by boiling the mixture under reflux.

The new substituted amines of Formula I can also be produced by commencing with a compound having the general structure of Formula I but which contains one or more carbonyl groups which are then reduced to $CH_2$ groups by the method of Wolff Kishner or by treatment with a complex metal hydride or with nascent or catalytically activated hydrogen.

The reduction according to Wolff Kishner is effected by treatment of the starting compound with anhydrous hydrazine in absolute alcohol in an autoclave in which the reaction temperature is raised up to about 250° C. As a catalyst for this reaction, sodium alcoholate is advantageously used. This reduction can also be modified according to the method of Huang Minlon by using hydrazine hydrate as reducing agent, and the reaction is performed in a high boiling solvent miscible with water, such as diethylene glycol or triethylene glycol, as well as in the presence of an alkali such as sodium hydroxide. The reaction mixture is boiled for some time, generally 3 to 4 hours, under reflux. The water is then distilled off and the residue heated to about 200° C for a while. This will decompose the hydrazone that has been formed while the carbonyl group that was originally present is converted into a $CH_2$ group.

If in the starting material the carbonyl group is next to an amino group, a complex metal hydride can be used as the reducing agent, such as lithium aluminum hydride, sodium borohydride or aluminum borohydride. The work is preferably done in the presence of an inert solvent, and if necessary, also in the presence of water. The reaction is brought to completion by heating the mixture to boiling.

Reduction with nascent hydrogen can be effected, for example, by treating the starting materials with a mixture of zinc and hydrochloric acid, amalgamated zinc and hydrochloric acid, or tin and hydrochloric acid. The work is done either with a water-alcohol solution or in a heterogeneous phase with a mixture of water and benzene or toluene. The reaction is brought to completion by heating the reaction mixture to boiling.

Conversion of a carbonyl group into a $CH_2$ group can also be effected by treating the starting material with catalytically activated hydrogen. For this purpose use is made of the usual catalysts such as the noble metal catalysts or Raney nickel or Raney cobalt. The catalyst can be used in the form of oxides or carrier catalysts or finely divided metal catalysts. The work is done, for example, under slightly elevated pressure and at room temperature or higher temperatures (up to about 200° C.). If an acid amide is used as the starting material, then copper chromium oxide catalysts can be used for the hydrogenation. The catalytic hydrogenation is preferably performed in the presence of a solvent such as methanol or ethanol, and if necessary also with the addition of an acid such as HCl.

(c) A compound having the general structure of Formula I with a functionally altered hydroxyl and/or amino groups can according to this invention have its hydroxyl and/or amino groups set free hydrolytically, alcoholytically or aminolytically. The functionally altered hydroxyl group can, for example, be in the form of an O-acyl- or ether group, while the functionally altered amino group can, for example, be a N-acyl group. The starting compound can be subjected to an ordinary hydrolysis whereby hydroxy and amino groups would be set free. Such a hydrolysis can be performed in an acid or alkaline medium. The work is advantageously performed in an aqueous alcoholic medium and at the boiling temperature of the reaction solution. For hydrolytic splitting of ether groups, the conditions would have to be more drastic. In that case the work is done, for example, with a concentrated aqueous hydrohalide solution and the reaction is performed at higher temperatures. The amino group of the starting materials having the general structure of Formula I can also be substituted by a Mg-Halide group (containing either Cl, Br or I). The Mg-Halide group can be removed by the usual hydrolysis, for example, by treatment with dilute aqueous hydrochloric acid, or with an aqueous solution of ammonium chloride. Such start-materials can be obtained, for example by reaction of a Shiff's base with a corresponding Grignard compound.

An esterified hydroxyl group or an amino group of a secondary amine of Formula I that has been altered by an acyl group, as for example, an arylsulfonyl, benzoyl or acetyl group, can also be set free alcoholytically by, for example, treating such a compound with a lower aliphatic alcohol in the presence of hydrogen chloride.

The acyl group of the amino group can also be removed aminolytically by treating the starting material, for example, in an autoclave with ammonia or an amine such as methyl- or ethylamine. The amine or the ammonia then also serves as a solvent, and is, therefore, used in large excess. The reaction is preferably performed at a temperature of about 250° C. The liberating of the hydroxyl group can be accomplished in a similar manner. For these reactions, it is in fact possible to use any of the reactions described in Houben-Weyl, "Methoden der organischen Chemie," 4th Edition, vol. XI/1, publication of Georg Thieme, Stuttgart 1957, pages 926 ff.

The work can also be commenced with a compound of Formula I, but which instead of an OH group has a primary amino group which can then be converted into a hydroxyl group by the usual diazotization.

(d) A substituted amine of Formula I can be converted into a physiologically compatible acid addition salt by treatment wtih acids. The acids that should be considered for this purpose are, for example, mineral acids such as hydrochloric acid, hydrobromic acid, sulfuric acid, nitric acid and orthophosphoric acid, or organic acids such as acetic acid, propionic acid, pivalic acid, succinic acid, maleic acid, fumaric acid, lactic acid, malic acid, tartaric acid, citric acid, gluconic acid, L-ascorbic acid, benzoic acid, salicyclic acid, methylsulfonic acid, ethyldisulfonic acid, p-toluene sulfonic acid, naphthalene disulfonic acid and β-hydroxy ethylsulfonic acid.

Conversely, it is obviously also possible to liberate a substituted amine of Formula I from its acid-addition salt by treatment with a strong base.

If by the methods of this invention, racemic mixtures are produced, these can, if desired, be separated into their optically active antipodes by the usual procedures, as for example, by treatment wtih optically active acids. Such a separation can be accomplished by any of the methods described in Houben-Weyl, vol. 4/2, pages 513–519.

The compounds of this invention possess improved pharmacological properties, are characterized by a good therapeutic index, and exhibit only minor undesired side effects, thus being useful for administration to mammals.

They can be used in admixture with the usual carrier materials that are used in human and veterinary medicine. The carrier materials may be such organic or inorganic substances as are suitable for parenteral, enteral or topical application and which do not enter into reaction with the new compounds, as for example, water, vegetable oils, polyethylene glycols, gelatins, lactose, starch, magnesium stearate, talcum, vaseline, cholesterol, etc. For parenteral application, solutions are especially suitable, and preferably oily or aqueous solutions, as well as suspensions or emulsions. For enteral application tablets or dragees can be used, whereas for topical application salves and cremes are used, and to which may be added antiseptics, preservatives, stabilizers, wetting agents, salts to influence the osmotic pressure, or buffer materials.

The new compounds of this invention possess a central stimulating activity which varies largely with the various substituents of the phenyl nucleus.

In addition, some of the compounds of this invention are characterized by an outstanding anorectic activity, often combined with diuretic properties. These types of compounds are preferably those represented by the Formula I where $R_2$ and $R_3$ represent hydrogen, and $R_4$ together with the group $(Y)_m$—$CH_3$ does not contain more than 4 carbon atoms.

Particularly efficacious anorectic compounds are

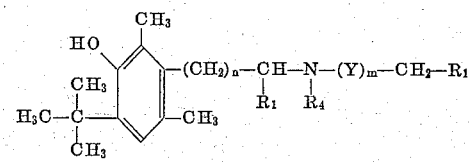

and

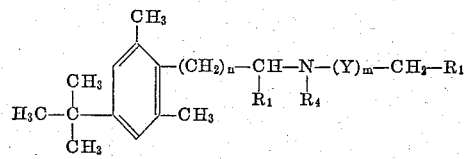

and

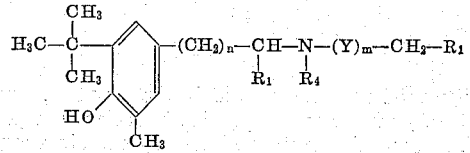

Among the amines of Formula I with two or three aromatic groups, there are some that are very effective circulatory remedies, especially those which lower the blood pressure, and spasmolytic agents which are characterized by the long durations of their effects. The amines of this group, and especially those with three aromatic residues also have a pronounced coronary widening effect so that such compounds could be used for the treatment of blood circulation disorders of the heart muscle. Certain of these compounds also have an antihistamine effect. Particularly advantageous amines for circulatory ailments are:

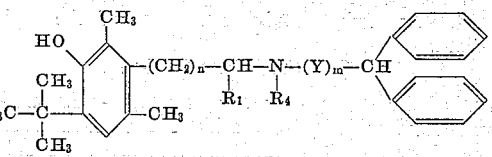

and

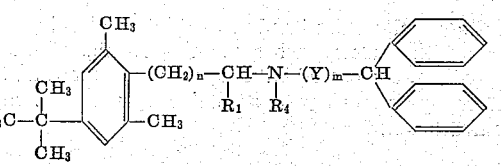

and

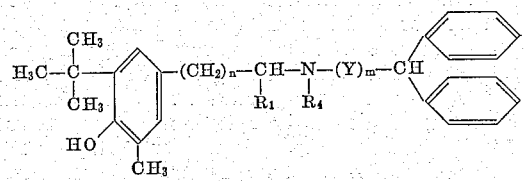

It has also been discovered that some of the compounds of this invention possess pronounced bactericidal and bacteriostatic properties, especially in relation to the tubercle bacillus. These compounds are preferably those characterized by the formula

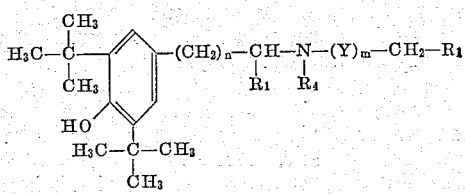

and

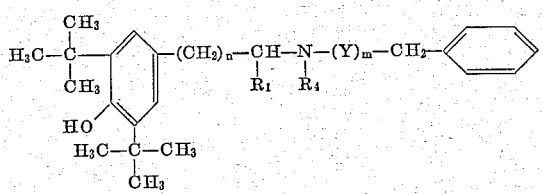

and

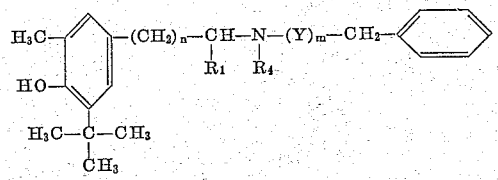

and

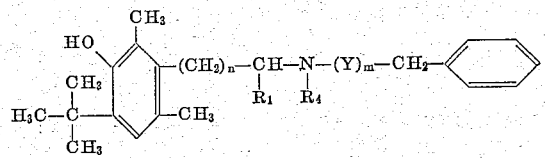

When used as pharmaceuticals, the new compounds of the present invention may be incorporated into pharmaceutical compositions which generally contain about 0.5–100 mg. of the active material. Examples for such preparations are the following:

(I) TABLET

| | Parts |
|---|---|
| N-ethyl-4-tert.butyl-3-hydroxy-N,2,6-trimethyl-phenethylaminehydrochloride | 10 |
| Lactose | 83 |
| Corn starch | 4 |
| Magnesium stearate | 1 |
| And talc | 2 | are thoroughly mixed. The obtained powder is pressed into tablets each containing 10 mg. of the active ingredient.

(II) COATED TABLET

| | |
|---|---|
| Parts of 4-tert.butyl-3-hydroxy-N,N2,6 - tetramethyl phenethylamine-hydrochloride | 15 |
| Parts of lactose | 83 |
| Parts of talc | 2 | are thoroughly mixed and pressed into tablets in the usual way. The tablets, each containing 15 mg. of the active ingredient, are coated with sugar syrup according to customary processes up to a total weight of 200 mg. per coated tablet.

(III) SUB-LINGUAL TABLET

One tablet contains:

| | Mg. |
|---|---|
| N-ethyl-N-[3-(4' - tert.butyl - 3' - hydroxy - 2',6' - dimethylphenyl)-1 - methyl - propyl] - amine - hydrochloride | 5 |
| Lactose | 60 |
| Sorbitol | 20 |
| Magnesium stearate | 3 |
| Corn starch | 12 |

(IV) HARD GELATINE CAPSULES

Hard gelatine capsules are filled with a fine powder consisting of

| | Parts |
|---|---|
| 3-(4'-tert.butyl-3'-hydroxy-2',6' - dimethylphenyl) - 1-methyl-N-(1'-methyl - 3',3' -diphenylpropyl) - propylamine-hydrochloride | 10 |
| Lactose | 85 |
| Talc | 3 |
| Magnesium stearate | 2 | so that each capsule contains 10 mg. of the active ingredient.

(V) COATED TABLET

The inner tablet contains

| | Mg. |
|---|---|
| N-ethyl-3-(4'-tert.butyl-3' - hydroxy - 2',6' - dimethylphenyl)-N-1-dimethylpropylamine-hydrochloride) | 15 |
| Lactose | 80 |
| Potato starch | 5 | and is coated with sugar syrup up to a total weight of 200 mg. per coated tablet.

In an analogous manner, pharmaceutical preparations may be prepared from the other active compounds covered by Formula I.

For the use as bactericidal agents, the new compounds of the present invention may be mixed up with all customary carrier or vehicular or filler substances and supplementary materials. Preferably, they are used in aqueous or alcoholic solutions containing from 0.01 to 10% of the active ingredient. In most cases, it is advisable to use the new amines in the form of their inorganic acid addition salts, such as the hydrochlorides or the sulfates. Preferably preservatives such as cresols or usual wetting agents are added.

Aside from their pharmacological uses, the new amines of this invention are very useful antioxidants, particularly in the manufacture of rubber, synthetic fibres and resins, and in motor fuels. Furthermore, they have been found useful in polymerization reactions by taking up the formed radicals. They may be used as well as preserving agents, disinfecting agents and solubilizers.

In addition, it is apparent from the foregoing specification that the secondary amines of this invention (compounds wherein $R_4$ means H) are important intermediates in the preparation of the tertiary amines of this invention. These ones are highly useful in the preparation of the corresponding quaternary ammonium compounds which are highly effective bactericides, especially those wherein the nitrogen is substituted by two lower alkyl groups and one alkyl group containing from 8 to 12 carbon atoms. These quaternary compounds are prepared from the compounds of this invention by the conventional methods for the preparation of quaternary compounds.

Without further elaboration it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

11.0 g. 4-tert.butyl-3-hydroxy-2,6-dimethyl-phenethylamine (obtained by hydrogenation of 4-tert.butyl-3-hydroxy - 2,6 - dimethyl - benzylcyanide (disclosed in DBP 1,117,588 of May 10, 1962),) and 10 g. Raney nickel are boiled with 100 ml. ethanol 5 hours under reflux. After cooling, the catalyst is filtered off with suction and the solvent is distilled off. The residue is dissolved in 100 ml. ether and is shaken out with 100 ml. 5% hydrochloric acid. The starting material then crystallizes out as the hydrochloride. After filtering off the crystals, the aqueous solution is made alkaline with a 32% NaOH solution and the basic materials isolated by extraction with ether. The crude base is converted into the hydrochloride and the latter recrystallized from alcohol-ether. The yield is 3 g. N-ethyl-4-tert.butyl-3-hydroxy-2,6-dimethyl-phenethylamine-hydrochloride which melts with decomposition at 264° C.

Example 2

18.5 g. phenethylbromide, 22.1 g. 4-tert.butyl-3-hydroxy-2,6-dimethylphenethylamine and 100 ml. toluene are heated 3 hours on a steam bath. After being cooled, the hydrobromide of the starting material is removed with a suction filter. The filtrate is concentrated under vacuum and the residue converted into the hydrochloride by ether and hydrochloric acid, which hydrochloride was then extracted with benzene. The product of 6 g. of 4-tert.butyl-3-hydroxy-2,6-dimethyl-diphenethylamine-hydrochloride after recrystallization from alcohol-ether had a M.P. of 217-218° C.

Example 3

22.1 g. 4-tert.butyl-3-hydroxy-2,6-dimethyl-phenethylamine and 20.8 g. diphenyl-acrolein are converted in toluene into the corresponding Schiff base which is then hydrogenated in 600 ml. methanol and 600 ml. alcohol in the presence of 2 g. platinum oxide at normal pressure and temperature. The hydrogenated solution is reacted with alcoholic hydrochloric acid, the catalyst filtered off, and the solvent distilled off. After recrystallization from methanol, a yield of 30 g. 4-tert.butyl-3-hydroxy-2,6-dimethyl-N-(3',3'-diphenyl-propyl)-phenethylamine with a M.P. of 252° C. is obtained.

Example 4

From 12 g. 4-tert.butyl-3-hydroxy-2,6-dimethyl-phenethylamine and 19.2 g. 4,4-diphenyl-butane-2-one, the corresponding Schiff base is produced, which is then hydrogenated with 2 g. platinum oxide in 200 ml. methanol under normal pressure and at room temperature. After being filtered and concentrated, the residue is dissolved in alcohol and is reacted to initial acidity with an ether solution of methylsulfonic acid. The solvent is distilled off, and the salt recrystallized from alcohol-petroleum-ether. The yield was 32 g. 4-tert.butyl-3-hydroxy-2,6-dimethyl - N - (1' - methyl-3',3'-diphenylpropyl)-phenethylamine-methane-sulfonate with a M.P. of 180-182° C.

Example 5

A Schiff base that was produced from 22.1 g. 4-tert.butyl - 3 - hydroxyl-2,6-dimethyl-phenethylamine and 15.0 g. phenoxyacetone in 100 ml. toluene is hydrogenated with 1 g. platinum oxide in methanol under normal pressure and room temperature. The fraction that distilled at 190-200° C./0.1 Torr is converted into the hydrochloride in the usual manner. The yield was 6 g. 4-tert.butyl - 3 - hydroxy - 2,6 - dimethyl - N - (1' - methyl-2' - phenoxyethyl)-phenethylamine-hydrochloride, which after recrystallization from benzene has a M.P. of 184-185° C.

Example 6

22.1 g. 4-tert.butyl-3-hydroxy-2,6-dimethyl-phenethylamine and 10 g. phenoxyethylbromide are heated 4 hours to 150° C. The reaction product is dissolved in a small quantity of alcohol and after being reacted with dilute NaOH solution, is extracted with ether. After concentration of the ether solution, the crude product is distilled in vacuum and the fraction which passes over at 170-180° C./0.01 mm. Hg is then reacted with an equivalent amount of methylsulfonic acid in ether. The yield is 4-tert.butyl-3-hydroxy-2,6-dimethyl - N - (2'-phenoxyethyl)-phenethylamine-methane-sulfonate which after recrystallization from alcohol-ether melts at 175° C.

Example 7

23.4 g. 4-tert.butyl-3-hydroxy-2,6-dimethyl-phenylacetone (produced by reacting 4-tert.butyl-3-hydroxy-2,6-dimethyl-benzyl-cyanide with methyl-magnesium iodide, M.P. 137-138° C.), 10 g. methylamine in methanol solution and about 300 ml. methanol are agitated 15 hours at 70° C. The reaction solution is then hydrogenated with 20 g. Raney nickel under about 100 atm. at 70° C. The catalyst is filtered off, the methanol distilled off, and the residue converted into the hydrochloride. After recrystallization from alcohol-ether a yield of 17 g. 2-(4'-tert.butyl - 3' - hydroxy - 2',6' - dimethyl - phenyl) - N, 1-dimethyl-ethylamine-hydrochloride with a M.P. of 240-242° C. is obtained.

In a similar manner other amines and salts thereof are produced by reaction of 4-tert.butyl-3-hydroxy-2,6-dimethylphenylacetone with (a) Isopropylamine: yielding 2 - (4' - tert.butyl - 3'-hydroxy - 2',6' - dimethylphenyl)-1-methyl-N-1-isopropyl-ethylamine; the hydrochloride thereof melts at 251-253° C. after recrystallization from methanol-ether;

(b) 3-phenylpropylamine: yielding 2-(4'-tert.butyl-3'-hydroxy - 2',6' - dimethyl - phenyl) - 1 - methyl - N-(3'-phenylpropyl)-ethylamine; the hydrochloride thereof melts at 182-184° C. after recrystallization from alcohol/ether;

(c) 3,3-diphenylpropylamine: yielding 2-(4'-tert.butyl-3' - hydroxy - 2',6' - dimethyl - phenyl) - 1 - methyl-N-(3',3'-diphenylpropyl)-ethylamine; the hydrochloride thereof melts at 250-252° C. after recrystallization from alcohol;

(d) 1-methyl-3,3-diphenylpropylamine: yielding 2-(4'-tert.butyl - 3' - hydroxy - 2',6' - dimethyl - phenyl) - 1-methyl-N-(1'-methyl-3',3'-diphenyl-propyl) - ethylamine; racemate I: M.P. of the hydrochloride from ethyl acetate, 285-290° C.; racemate II: M.P. of the hydrochloride from CCl₄/petroleum ether, 140-145° C.;

(e) Ethylamine: yielding N-ethyl-2-(4'-tert.butyl-3'-hydroxy-2',6'-dimethylphenyl) - 1 - methyl - ethylamine; the hydrochloride thereof from alcohol melts at 263-265° C.

In a similar manner from 1-(4'-tert.butyl-3'-hydroxy-2',6'-dimethylphenyl)-butane-2-one (produced from 4-tert.butyl - 3 - hydroxy - 2,6 - dimethylbenzyl - cyanide with ethyl-magnesium bromide) and methylamine there is produced 1 - ethyl-2-(4'-tert.butyl-3'-hydroxy-2',6'dimethylphenyl)-N-methyl-ethylamine hydrochloride.

Example 8

21.7 g. 4-tert.butyl-3-hydroxy-2,6-dimethyl-benzyl-cyanide and 22.1 g. 4-tert.butyl-3-hydroxy-2,6-dimethyl-phenethylamine are hydrogenated in 400 ml. methanol in the presence of 40 g. Raney nickel at 100° C. and under about 180 atm. After the hydrogenated solution is filtered and concentrated, the hydrochloride of the basic mixture is produced and is boiled with water. The portion that is insoluble in water is recrystallized from alcohol. The yield is 5 g. of bis-(4-tert.butyl-3-hydroxy-2,6-dimethyl-phenethyl)-amine-hydrochloride which melts at 270-272° C. with preliminary sintering.

Example 9

26.3 g. N-ethyl-α-(4-tert.butyl-3-hydroxy-2,6-dimethylphenyl)-acetamide (M.P. 150-152° C., obtained from 4-tert.butyl - 3 - hydroxy - 2,6 - dimethyl-benzyl-cyanide by saponification followed by treatment with SOCl₂ and ethylamine) are dissolved in 150 ml. absolute tetrahydrofuran and with cooling the solution is added drop by drop to a suspension of 12 g. LiAlH₄ in 300 ml. absolute tetrahydrofuran, and the reaction mixture is then boiled 7 hours under reflux. After decomposition of the excess LiAlH₄ with water-containing tetrahydrofuran, the mixture is poured into 2.5 liters ice water, is acidified with an excess of 25% hydrochloric acid, and is extracted with ether whereby the starting material is again obtained. To the acid aqueous solution are added 50 g. tartaric acid and the resultant mixture is poured into an excess of a cold concentrated NaOH solution. The alkaline solution is extracted with ether. The basic ingredients are converted into their hydrochlorides, from which N-ethyl-4-tert.butyl-3-hydroxy-2,6-dimethyl-phenethylamine hydrochloride is obtained which melts at 261–264° C. with decomposition.

*Example 10*

26.3 g. N-acetyl-4-tert.butyl-3-hydroxy - 2,6 - dimethyl-phenethylamine (produced by acetylating 4-tert.butyl-3-hydroxy - 2,6 - dimethyl-phenethylamine, M.P. 123–125° C.) are reacted with LiAlH₄ in tetrahydrofuran and prepared as in Example 9. Upon acidifying with hydrochloric acid, the greater portion of it crystallizes out immediately as the hydrochloride. After recrystallization from methanol-ether, the yield is 16 g. of N-ethyl-4-tert.butyl-3-hydroxy - 2,6 - dimethyl-phenethylamine-hydrochloride which melts at 263–266° C. with decomposition.

*Example 11*

A solution of 9.1 g. N-acetyl-3-(3',5'-di-tert.butyl-4'-hydroxyphenyl) - propylamine (produced from 3,5 - di-tert.butyl - 4 - hydroxy - benzaldehyde by reaction with cyanacetic acid to produce the corresponding cinnamic acid nitrile, followed by hydrogenation and acetylation) in 150 ml. dry ether is added drop by drop with stirring and cooling to 2.8 g. lithium-aluminum-hydride in 50 ml. dry ether. After all of it is added, the mixture is heated to boiling one hour, is then cooled to 0–+5° C., and is reacted with moist ether, ammonium chloride and aqueous ammonia. The ether layer is separated and after drying over sodium sulfate the solvent is evaporated. The crude base (7.9 g.) is distilled under high vacuum. The yield is 5.3 g. (61% theoretical) N - ethyl - 3 - (3',5'-di-tert.butyl-4'-hydroxy-phenyl)-propylamine, B.P. 122–124° C./0.01 mm. Hg. The hydrochloride melts at 162–164° C.

*Example 12*

12 g. of the Schiff base produced from 4-tert.butyl-3-hydroxy-2,6-dimethyl - phenethylamine and acetone are dissolved in 200 ml. methanol and hydrogenated with 1.5 g. platinum oxide under normal pressure and at room temperature until the theoretical amount of hydrogen has been taken up (about 2 hours). After the catalyst is removed by filtration, the solvent is distilled off and the raw base is converted into its hydrochloride. After recrystallization from alcohol/ether, the yield is 10 g. 4-tert.butyl - 3 - hydroxy - 2,6-dimethyl-N-i-propyl-phenylethylamine-hydrochloride, M.P. 230° C.

In a similar manner there is produced:

(a) N - benzyl - 4 - tert.butyl - 2,6 - dimethyl - phenethylamine from 4-tert.butyl - 2,6 - dimethyl-phenethylamine and benzaldehyde, which hydrochloride thereof after recrystallization from alcohol/ether melts at 249–252° C.;

(b) N - benzyl - 4 - tert.butyl - 3 - hydroxy - 2,6 - dimethyl-phenethylamine from 4-tert.butyl-3-hydroxy-2,6-dimethyl-phenethylamine and benzaldehyde, which hydrochloride thereof melts at 218–220° C.;

(c) 4 - tert.butyl - 3 - hydroxy - 2,6 - dimethyl - N - (3'-phenylpropyl)-phenylethylamine from 4-tert.butyl-3-hydroxy-2,6-dimethyl-phenethylamine and cinnamic aldehyde, which hydrochloride thereof after recrystallization from alcohol/ether melts at 204° C.;

(d) 4 - tert.butyl - 3 - hydroxy - 2,6 - dimethyl - N - (1' - methyl - 3' - phenylpropyl)-phenethylamine from 4-tert.butyl-3-hydroxy - 2,6 - dimethyl-phenethylamine and benzalacetone, which hydrochloride thereof after recrystallization from benzene melts at 160–162° C.

*Example 13*

The Schiff base which was produced from 23.5 g. 3-(3'-ethyl-5'-tert.butyl-4'-hydroxyphenyl)-propylamine and 6.4 g. propionaldehyde, is dissolved in 20 ml. absolute alcohol and then hydrogenated in the presence of 2.5 g. platinum oxide under 6 atm. at 60° C. The solution is freed from the catalyst and is evaporated down; a little water is added to separate the oily base, which is then dissolved in ether. After drying and evaporation of the solvent, the raw base is distilled under high vacuum. The yield is 16.8 g. (61% theoretical) N - propyl - 3 - (3' - ethyl - 5' - tert.butyl - 4'-hydroxylphenyl)-propylamine, B.P. 129–131° C. under 0.1 mm. Hg.

*Starting material.*—p-Bromo-o-ethylphenol is converted with isobutylene into 2-ethyl-4-bromo-6-tert.butylphenol. This is hydrogenated to 2-ethyl-6-tert.butylphenol and is converted by the method of Vilsmeier into 3-ethyl-5-tert.butyl-4-hydroxylbenzaldehyde which by condensation with cyanacetic acid and subsequent decarboxylation is converted into 3-ethyl-5-tert.butyl-4-hydroxy-cinnamic-acid-nitrile. Hydrogenation of this nitrile yields 3-(3'-ethyl-5'-tert.butyl-4'-hydroxylphenyl)-propylamine with a B.P. of 151–154° C. under 0.1 mm. Hg.

*Example 14*

14.2 g. N-benzyl-4-tert.butyl-N-2,6-trimethyl-phenethylamine-hydrochloride (produced by benzylation and subsequent methylation of 4-tert.butyl-2,6-dimethyl-phenethylamine) are hydrogenated with 4 g. 5% palladium charcoal in a methanol solution under normal pressure and at room temperature until the calculated amount of hydrogen is taken up. After filtration and concentration, the yield is 8.5 g. of 4-tert.butyl-N,2,6-trimethyl-phenethylamine-hydrochloride which after recrystallization from alcohol/ether melts at 252–254° C.

In an analogous manner 4-tert.butyl-3-hydroxy-N,2,6-trimethyl-phenethylamine-hydrochloride is produced from N - benzyl - 4 - tert.butyl - 3 - hydroxy - N,2,6 - trimethyl-amine-hydrochloride. After recrystallization from alcohol, it melts at 259° C. with decomposition.

*Example 15*

21.8 g. 4-tert.butyl-2,6-dimethyl-phenylacetone (produced from 4-tert.butyl-2,6-dimethyl-benzyl-cyanide by reaction with methyl-magnesium iodide as an oil with a B.P. at 0.1 mm. Hg of 91–94° C.), 21.1 g. 1-methyl-3,3-diphenylpropylamine and 150 ml. toluene are boiled 2 hours under reflux. After concentration in a vacuum, the residue is hydrogenated with 5 g. platinum oxide in 400 ml. methanol under normal pressure and at room temperature. After filtration and concentration, the base is treated with ether and hydrochloric acid to convert it into the hydrochloride. The crude hydrochloride is recrystallized from 50% alcohol producing 12 g. 2-(4'-tert.butyl - 2',6' - dimethylphenyl) - 1 - methyl - N - (1'-methyl - 3',3' - diphenylpropyl) - ethylamine - hydrochloride, M.P. 274–276° C.

*Example 16*

24.8 g. 4-(4'-tert.butyl - 3' - hydroxy - 2',6' - dimethylphenyl)-butane-2-one (M.P. 102–103° C., produced by reaction of acetoacetic ester with 4-tert.butyl-3-hydroxy-2,6-dimethylbenzylchloride) are reacted with methylamine as in Example 15. The yield is 22.5 g. of 3-(4'-tert.butyl - 3' - hydroxy - 2',6' - dimethylphenyl) - N,1-dimethyl-propylamine which after recrystallization from benzene melts at 125° C. The hydrochloride after recrystallization from alcohol/ether melts at 184–186° C.

In an analogous manner there was produced by reaction of 4-(4'-tert.butyl-3'-hydroxy-2',6'-dimethylphenyl))-butane-2-one with:

(a) n-Propylamine: 3-(4'-tert.butyl-3'-hydroxy-2',6'-dimethylphenyl)-1-methyl-dipropylamine which hydrochloride thereof melts at 125–126° C. with decomposition;

(b) n-Butylamine: N-n-butyl-3-(4'-tert.butyl-3'-hydroxy-2',6'-dimethylphenyl)-1-methyl-propylamine, which crystallized from alcohol melts at 105–106° C., while its hydrochloride from alcohol/ether melts at 175–177° C.;

(c) 1-methyl-2-phenylethylamine: 3-(4'-tert.butyl-3'-hydroxy-2',2'-dimethylphenyl)-1-methyl-N-(1'-methyl-2'-phenylethyl)-propylamine which hydrochloride thereof from alcohol/ether melts at 234–236° C.;

(d) 3,3-diphenylpropylamine: 3-(4'-tert.butyl-3'-hydroxy-2',6'-dimethylphenyl)-1-methyl-N-(3',3'-diphenylpropyl)-propylamine which hydrochloride thereof from ethyl acetate melts at 178–179° C.;

(e) 1-methyl-3,3-diphenyl-propylamine: 3-(4'-tert.butyl-3'-hydroxy-2',6'-dimethylphenyl)-1-methyl-N-(1'-methyl-3',3'-diphenylpropyl)-propylamine, the hydrochloride of racemate I thereof crystallized from alcohol melts at 230–232° C., and the hydrochloride of racemate II thereof from alcohol melts at 246–248° C.;

(f) 4-tert.butyl-3-hydroxy-2,6-dimethyl-phenethylamine: N-(4-tert.butyl-3-hydroxy-2,6-dimethylphenethyl)-N-[3-(4'-tert.butyl-3'-hydroxy-2',6'-dimethylphenyl)-1-methyl-propyl]-amine which hydrochloride thereof from alcohol melts at 227–228° C., and which β-hydroxy-ethane-sulfonate thereof melts at 190–192° C.;

(g) Ethylamine: N-ethyl-3-(4'-tert.butyl-3'-hydroxy-2',6'-dimethylphenyl)-1-methyl-propylamine which melts at 110–111° C. and which hydrochloride thereof from alcohol/ether melts at 184–185° C.

In a similar manner there is obtained by reaction of 4-(4'-tert.butyl-2',6'-dimethylphenyl)-butane-2-one (produced from 4-tert.butyl-2,6-dimethylbenzyl-chloride and acetoacetic ester) with:

(h) 3,3-diphenylpropylamine: 3-(4'-tert.butyl-2',6'-dimethylphenyl)-1-methyl-N-(3',3'-diphenylpropyl)-propylamine which hydrochloride thereof from acetone/petroleum ether melts at 184–186° C.;

(i) 1-methyl-3,3-diphenylpropylamine: 3-(4'-tert.butyl-2',6'-dimethylphenyl)-1-methyl-N-(1'-methyl-3',3'-diphenylpropyl)-propylamine, the hydrochloride of the racemate mixture melts at 97–103° C.

*Example 17*

By analogy to Example 16 there is obtained from 27.4 g. 4-(2',4'-di-tert.butyl-6'-methylphenyl)-butane-2-one (produced from the 2,4-di-tert.butyl-6-methyl-benzylchloride described in Recueil, vol. 78, page 81 (1959), by reaction with sodium acetoacetic ester followed by saponification and decarboxylation, M.P. 56–58° C.) and 22.5 g. 1-methyl-3,3-diphenyl-propylamine by hydrogenation and reaction of the resulting base with HCl in ether to produce 11.5 g. 3-(2',4'-di-tert.butyl-6'-methylphenyl)-1-methyl-N-(1'-methyl-3',3'-diphenyl-propyl)-propylamine-hydrochloride, M.P. 264–266° C.

*Example 18*

From 12.5 g. of 3-(4'-tert.butyl-3'-hydroxy-2',6'-dimethylphenyl)-1-methylpropylamine (produced from (4'-tert.butyl-3-hydroxy-2',6'-dimethylphenyl)-butane-2-one by reaction with ammonia with subsequent hydrogenation) and 6.6 g. cinnamic aldehyde, the corresponding Schiff base is produced, which is then hydrogenized with 2 g. platinum oxide in 500 ml. methanol under normal pressure and at room temperature. After filtration and concentration of the hydrogenated solution, the residue is dissolved in 400 ml. petroleum ether and is reacted with the corresponding amount of alcoholic methyl-sulfonic acid solution. The precipitate is recrystallized from alcoholic petroleum ether, yielding 14 g. 3-(4'-tert.butyl-3'-hydroxy-2',6'-dimethylphenyl)-1-methyl-N-(3'-phenylpropyl)-propylamine-hydrochloride melting at 194–195° C.

In an analogous manner there is produced by reaction of 3-(3',5'-di-tert.butyl-4'-hydroxyphenyl)-propylamine (produced by reaction of 3,5-di-tert.butyl-4-hydroxybenzaldehyde with cyanacetic acid to the corresponding cinnamic acid nitrile with subsequent hydrogenation) with:

(a) Propionaldehyde: N-propyl-3-(3',5'-di-tert.butyl-4'-hydroxyphenyl-propylamine, B.P. 137–141° C./0.05 mm. Hg, M.P. of the hydrochloride 138–140° C.;

(b) Benzohydryl acetone: N-(1-methyl-3',3'-diphenylpropyl)-3-(3",5"-di-tert.butyl-4"-hydroxyphenyl)-propylamine, the hydrochloride of which melts at 168–170° C.;

(c) Cinnamaldehyde: N-(3'-phenyl-propyl)-3-(3",5"-di-tert.butyl-4"-hydroxy-phenyl)-propylamine, B.P. 186–190° C./0.2 mm. Hg, the hydrochloride melting at 138–140° C.;

(d) Benzaldehyde: N-benzyl-3-(3',5'-di-tert.butyl-4'-hydroxyphenyl)-propylamine, the hydrochloride of which melts at 194–196° C.;

(e) Benzylmethylketone: N-(1'-methyl-2'-phenylethyl)-3-(3",5"-di-tert.butyl-4"-hydroxyphenyl)-propylamine, the hydrochloride of which melts at 161–163° C.

*Example 19*

28 g. N-acetyl-4-tert.amyl-3-hydroxy-2,6-dimethylphenethylamine are reacted with LiAlH₄ in tetrahydrofuran and worked up as in Example 9. The raw base is converted into its hydrochloride, which, after recrystallization from alcohol-ether, melts at 242–244° C.

The required starting material is produced by reacting 2,4-dimethylphenol with trimethyl-ethylene to produce 2-tert.amyl-4,6-dimethyl-phenol which is then chloromethylated, reacted with NaCN, hydrogenated, and acetylated with acetic anhydride.

*Example 20*

By analogy to Example 19, 29 g. N-acetyl-3-hydroxy-2,6-dimethyl-4-(3'-methylpentyl-3')-phenethylamine with LiAlH₄ are converted into N-ethyl-3-hydroxy-2,6-dimethyl-4-(3'-methylpentyl-3')-phenethylamine, producing 21 g. of the hydrochloride which after recrystallization from methanol/ether melts at 263–265° C. with decomposition.

As in Example 19, the starting material can be obtained from 2,4-dimethylphenol and 3-methyl-pentene-(2).

*Example 21*

The Schiff base which is produced from 5 g. 3-hydroxy-2,6-dimethyl-4-(3'-methylpentyl-3')-phenethylamine and 5 g. 4,4-diphenyl-butane-2-one is hydrogenated with 1 g. PtO₂ under normal pressure and at room temperature. After the catalyst is filtered off and the methanol distilled off, the residue is treated with ether and HCl to convert it into the hydrochloride which after recrystallization from methanol-ether yields 5.5 g. of 3-hydroxy-2,6-dimethyl-4-(3'-methylpentyl-3')-N-(1'-methyl-3',3'-diphenylpropyl)-phenethylamine-hydrochloride which melts at 250–252° C.

*Example 22*

3.5 g. 4-tert.butyl-phenethylamine (J. Org. Chem., vol. 23, p. 1979 (1958)), 4.5 g. 30% formaldehyde solution and 5 g. formic acid are heated on a steam bath about 10 minutes. The reaction mixture is poured upon 50 ml. 10% NaOH solution. The base is taken up in ether, and the aqueous solution shaken out once more with ether. After drying and concentrating the ether solution, the raw base is converted into the hydrochloride in the usual manner, producing 3 g. of 4-tert.butyl-N,N-dimethyl-phenethylamine-hydrochloride which melts at 227–229° C.

In an analogous manner there is produced:

(a) From 4-tert.butyl - N,N,2,6-tetramethylphenethylamine, the 4 - tert.butyl - N,N,2,6 - tetramethylphenethylamine, the hydrochloride of which melts with decomposition at 274–278° C.;

The starting material is produced by hydrogenation of 4-tert.butyl-2,6-dimethylbenzyl-cyanide;

(b) From 4-tert.-butyl-3-hydroxy-2,6 - dimethyl-phenethylamine, the 4-tert.butyl-3-hydroxy-N,N,2,6-tetramethyl-phenethylamine whose M.P. from benzene is 123–125° C., and the hydrochloride of which melts at 250–252° C.;

(c) From N-ethyl-4-tert.butyl-3-hydroxy-2,6-dimethyl-phenethylamine, the N-ethyl-4-tert.butyl-3-hydroxy-N,2,6-trimethyl-phenethylamine, the hydrochloride of which crystallized from alcohol/ether melts at 226–229° C.;

(d) From N-benzyl-4-tert.butyl-2,6-dimethyl-phenethylamine, the N-benzyl-4-tert.butyl-N,2,6-trimethyl-phenethylamine, the hydrochloride of which crystallized from alcohol/ether melts at 226–227° C.;

(e) From N-benzyl-4-tert.butyl-3-hydroxy-2,6-dimethyl-phenethylamine, the N-benzyl-4-tert.butyl-3-hydroxy-N,2,6 - trimethyl - phenethylamine, the hydrochloride of which melts with decomposition at 226–228° C.;

(f) From 4-tert.butyl-3-hydroxy-2,6-dimethyl - N - (1-methyl-3,3-diphenylpropyl)-phenethylamine, the N - (4-tert.butyl-3-hydroxy-2,6-dimethyl - phenethyl)-N-methyl-N-(1-methyl-3,3-diphenylpropyl) - amine, the hydrochloride of which melts with decomposition at 195–197° C.;

(g) From 2-(4-tert.butyl-3'-hydroxy - 2',6' - dimethylphenyl)-1-methyl-ethylamine, the 2 - (4'-tert.butyl-3'-hydroxy-2'-6'-dimethylphenyl)- N,N,1-trimethyl-ethylamine, the hydrochloride of which crystallized from alcohol/ether melts at 230–231° C.;

(h) From 2-(4'-tert.butyl-3'-hydroxy - 2',6' - dimethylphenyl)-1-methyl-N - (3,3-diphenylpropyl-ethylamine, the N - [2 - (4'-tert.butyl-3'-hydroxy-2',6'-dimethylphenyl)- 1-methyl-ethyl]-N-methyl-N -(3,3-diphenylpropyl) - amine, the hydrochloride monohydrate of which melts with decomposition at 145–147° C.;

(i) From 2 - (4'-tert.butyl - 2',6' - dimethylphenyl) - 1-methyl-N-(1-methyl-3,3-diphenylpropyl)- ethylamine, the N-[2-(4'-tert.butyl-2',6'-dimethylphenyl)-1-methyl-ethyl]-N-methyl-N-(1-methyl-3,3-diphenylpropyl)-amine, the hydrochloride of which melts with decomposition at 89° C.;

(k) From 2-(4'-tert.butyl-3'-hydroxy - 2',6' - dimethylphenyl)-1-methyl-N-(1-methyl-3,3-diphenylpropyl - ethylamine, the N-[2-(4'-tert.butyl-3'-hydroxy-2',6'-dimethylphenyl)-1-methyl-ethyl]-N-methyl - N - (1-methyl-3,3-diphenylpropyl)-amine, the hydrochloride monohydrate of which melts with decomposition at 155–160° C.;

(l) From 3-(4'-tert.butyl-3'-hydroxy - 2',6' - dimethylphenyl)-N,1-dimethyl-propylamine, the 3-(4'-tert.butyl-3'-hydroxy-2',6'-dimethylphenyl)-N,N,1-trimethyl-propylamine, the hydrochloride of which crystallized from alcohol/ether melts at 245–246° C.;

(m) From 3 - (4'-tert.butyl-2',6'-dimethylphenyl) - 1-methyl - N - (3,3-diphenylpropyl)-propylamine, the N-[3-(4'-tert.butyl-2',6'-dimethylphenyl - 1-methyl-propyl] - N-methyl-N-(3,3-diphenylpropyl)-amine, the hydrochloride of which melts with decomposition at 133–138° C.;

(n) From 3-(4'-tert.butyl-3'-hydroxy - 2',6' - dimethylphenyl)-1-methyl-N -(3,3-diphenylpropyl) - propylamine, the N-[3-(4'-tert.butyl-3'-hydroxy-2',6'-dimethylphenyl)-1-methyl-propyl]-N - methyl - N - (3,3-diphenylpropyl)-amine, which after crystallization from benzene-petroleum ether, melts at 110° C.;

(o) From 3 - (4'-tert.butyl - 2',6' - dimethylphenyl)-1-methyl-N - (1-methyl-3,3-diphenylpropyl) - propylamine, the N[3-(4'-tert.butyl-2',6'-dimethylphenyl) - 1 - methyl-propyl] - N - methyl - N - (1-methyl-3,3-diphenylpropyl)-amine, the hydrochloride of which melts with decomposition at 87–90° C.;

(p) From 4-tert.butyl-3-hydroxy-N,2,6-trimethyl-phenethylamine, the 4 - tert.butyl - 3 - hydroxy-N,N,2,6-tetramethylphenethylamine, which melts at 123–125° C.;

(q) From 2,4 di - tert.butyl-6-methyl-phenethylamine, the 2,4-di-tert.butyl-N,N,6-trimethyl-phenethylamine, the hydrochloride of which crystallized from alcohol/ether melts at 215–216° C.;

The starting material is produced from 2,4-di-tert.butyl-6-methyl-benzyl-chloride by reaction with NaCN, followed by hydrogenation;

(r) From 4 - tert.amyl - 3 - hydroxy-2,6-dimethyl-phenethylamine, the 4 - tert.amyl - 3 - hydroxy-N,N,2,6-tetramethyl-phenethylamine, the hydrochloride of which crystallized from alcohol/ether melts at 240–242° C.;

(s) From N - ethyl-4-tert.amyl-3-hydroxy-2,6-dimethyl-phenethylamine, the N-ethyl-4-tert.amyl-3-hydroxy-N,2,6-trimethyl-phenethylamine, the hydrochloride of which melts at 286–288° C.;

(t) From 3 - hydroxy-2,6-dimethyl-4-(3'-methylpentyl-3')-phenethylamine, the 3-hydroxy-N,N,2,6-tetramethyl-4-(3'-methylpentyl-3')-phenethylamine, whose hydrochloride melts at 259–261° C.;

(u) From N-ethyl-3-hydroxy-2,6-dimethyl-4-(3'-methylpentyl-3')phenethylamine, the N-ethyl-3-hydroxy-N,2,6-trimethyl-4-(3'-methylpentyl-3')-phenethylamine, the hydrobromide of which from alcohol/ether melts at 203–205° C.;

(v) From 3-hydroxy-2,6-dimethyl-4-(3'-methylpentyl-3') - N-(1'-methyl-3',3'-diphenylpropyl)-phenethylamine, the N - [2-(3'-hydroxy-2',6'-dimethyl-4'-((3"-methylpentyl-3"))phenyl)-ethyl]N-methyl-N-(1-methyl - 3,3 - diphenylpropyl)-amine, the hydrochloride of which melts with decomposition at 96–98° C.;

(w) From N-ethyl-2-(4'-tert.butyl-3'-hydroxy-2',6'-dimethylphenyl) - 1 - methyl-ethylamine, the N-ethyl-2-(4'-tert.butyl - 3' - hydroxy - 2',6' - dimethylphenyl)-N,1-dimethyl-ethylamine, the hydrochloride of which crystallized from alcohol melts at 213–215° C.;

(x) From 3-(2',4' - di - tert.butyl-6'-methylphenyl)-1-methyl - N-(1'-methyl-3',3'-diphenylpropyl)-propylamine, the N - [3-(2',4'-di-tert.butyl-6'-methylphenyl)-1-methyl-propyl] - N - methyl-N-(1-methyl-3,3-diphenylpropyl)-amine, the hydrochloride of which crystallized from alcohol melts at 183–185° C.;

(y) From N - ethyl - 3-(4'-tert.butyl-3'-hydroxy-2',6'-dimethylphenyl)-1-methylpropylamine, the N-ethyl-3-(4'-tert.butyl - 3' - hydroxy - 2',6' - dimethylphenyl)-N-1-dimethylpropylamine, the hydrochloride of which from alcohol/ether melts at 210–211° C.;

(z) From 1 - ethyl - 2 - (4'-tert.butyl-3'-hydroxy-2',6'-dimethylphenyl-N-methyl-ethyl)-amine, the 1-ethyl-2-(4'-tert.butyl-3'-hydroxy-2',6'-dimethylphenyl)-N,N-dimethyl-ethylamine, hydrochloride.

*Example 23*

22.1 g. 4-tert.butyl-3-hydroxy-2,6-dimethyl-phenethylamine are boiled 70 hours under reflux with 20 g. Raney nickel in 200 ml. ethanol. After cooling, the catalyst is filtered off with suction and the solvent distilled off. The residue is distilled in vacuum.

(a) The fraction 90–120° C./0.05 mm. Hg is recrystallized from petroleum ether, producing 10 g. of N,N-diethyl - 4 - tert.butyl-3-hydroxy-2,6-dimethyl-phenethylamine, M.P. 101–103° C.;

(b) The fraction 200–205° C./0.05 mm. Hg is recrystallized from petroleum ether, producing 8 g. of N-ethyl-N,N-bis - (4-tert.butyl-3-hydroxy-2,6-dimethylphenethyl)-amine, M.P. 129–130° C.

*Example 24*

8.8 g. 3 - (4'-tert.butyl-2',6'-dimethylphenyl)-1-methyl-N-(1-methyl-3,3-diphenylpropyl)-propylamine are boiled 5 hours under reflux with 30 ml. acetic anhydride. The excess of acetic anhydride and the solvent are distilled off under reduced pressure. The residue is dissolved in 40 ml. absolute tetrahydrofuran and while being stirred and cooled with ice, it is added drop by drop to a suspension of 2 g. LiAlH$_4$ in 100 ml. absolute tetrahydrofuran. The mixture is then boiled 4 hours under reflux, the surplus of LiAlH$_4$ decomposed with aqueous tetrahydrofuran, and the reaction mixture poured on ice and dilute hydrochloric acid. The solution is reacted with 10 g. tartaric acid, and into it is then stirred a large excess of ice cold concentrated NaOH solution. After extraction with ether and preparation in the usual manner, the raw base is obtained and is distilled in vacuum. The fraction which passes over between 205° and 210° C./0.05 mm. Hg is converted into the hydrochloride with ether and HCl. The yield is 5 g. N-ethyl-N-[3-(4′-tert.butyl-2′,6′-dimethylphenyl)-1-methyl - propyl]-N-(1-methyl-3,3-diphenylpropyl)-amine-hydrochloride which is obtained in amorphous form by precipitation from ethyl/acetate/petroleum ether, and melts with rapid decomposition at 100–102° C.

*Example 25*

9.2 g. 3-(4′-tert.butyl-3′-hydroxy-2′,6′-dimethylphenyl)-1 - methyl-N-(1-methyl-3,3-diphenylpropyl)-propylamine (racemate I) are first acetylated with acetic anhydride, and then reduced with LiAlH$_4$ as in Example 24. The raw base is dissolved in petroleum ether, is acidified with HCl in ether, and the solvent then completely distilled off. The hydrochloride is recrystallized from ethyl acetate and 50% ethanol. The yield is 5.5 g. N-ethyl-N-[3-(4′-tert.butyl-3′-hydroxy-2′,6′-dimethylphenyl)-1-methyl - propyl] - N - (1 - methyl-3,3-diphenylpropyl)-amine-hydrochloride, M.P. 202–204° C.

The racemate II of this end product is obtained from the racemate II of the starting material in a similar manner. After recrystallization from 50% ethanol, it melts at 204–206° C. Mixture melting point with racemate I: 183–188° C.

*Example 26*

5.5 g. (2-(4′-tert.butyl-3′-hydroxy-2′,6′-dimethylphenyl) - 1-methyl-N-3,3-diphenylpropyl)-ethylamine, 2.5 g. ethylene oxide, 0.5 ml. water and 50 ml. benzene are heated 20 hours to 200° C. in a bomb tube. After cooling, the solvent is drawn off under reduced pressure to dryness. The yield is 5 g. N-[2-(4′-tert.butyl-3′-hydroxy-2′,6′-dimethylphenyl) - 1 - methylethyl]-N-(β-hydroxyethyl)-N-(3,3-diphenylpropyl)-amine, which after recrystallization from cyclohexane-petroleum-ether melts at 125–126° C.

*Example 27*

11.4 g. 3-(4′-tert.butyl-3′-hydroxy-2′,6′-dimethylphenyl - 1 - methyl-N-(1-methyl-3,3-diphenylpropyl)-propylamine (racemate I), 3.4 g. ethylene oxide, 0.5 ml. water and 50 ml. benzene are heated 20 hours at 225° C. in a bomb tube. After cooling, the solvent is distilled off. The raw base is dissolved in dry benzene and examined by chromatography over 400 g. aluminum oxide. Benzene and benzene/chloroform, 5:1, were used to principally wash out the starting material. Extraction with chloroform yielded N-[3-(4′-tert.butyl-3′-hydroxy-2′,6′-dimethylphenyl) - 1-methyl-propyl-N-(β-hydroxyethyl)-N-(1-methyl-3,3-diphenylproyl)-amine], which is then recrystallized from ethyl acetate and 50% ethanol. The yield was 7 g.; M.P. 194–195° C.

*Example 28*

15 g. N-propyl-3-(3′,5′-di-tert.butyl-4′-hydroxyphenyl)-propylamine are hydrogenated with 5 g. 35% formaldehyde in 200 ml. methanol in the presence of 10 g. 5% palladium charcoal at room temperature and under normal pressure. The solution after being freed from catalyst is evaporated down under reduced pressure and the raw base (14.9 g.) is then distilled under a high vacuum. The yield is 10.1 g. of (66% theoretical) N-methyl-N-propyl - 3 - (3′,5′-di-tert.butyl-4′-hydroxyphenyl)-propylamine, B.P. 134–137° C./0.01 mm. Hg.

*Example 29*

11 g. 4 - tert.butyl-N,2,6-trimethyl-phenethylamine are boiled 55 hours under reflux with 8 g. Raney nickel and 120 ml. absolute alcohol. After cooling the catalyst is filtered off, the solvent distilled off, and the residue treated with ether and HCl to convert it into the hydrochloride. After recrystallization from acetone and petroleum ether, the yield is 12.5 g. of N-ethyl-4-tert.butyl-N,2,6-trimethyl-phenethylamine-hydrochloride, M.P. 233–235° C.

*Example 30*

22.9 g. 3 - (4-tert.butyl-3′-hydroxy-2′,6′-dimethylphenyl) - 1 - methyl-N-(1-methyl-3,3-diphenylpropyl)-propylamine (racemate I), 8.7 g. 35% formaldehyde solution and 14 g. formic acid are reacted in a manner analogous to Example 22. The residue is treated with HCl in petroleum ether/ethyl ether, the solvent distilled off, and the amorphous hydrochloride dissolved in 400 ml. benzene. After 15 to 20 minutes of boiling over a steam bath, the crystalline hydrochloride separates out, and after recrystallization, from ethyl acetate, it melts at 205–206° C. The yield is 20 g. N-[3-(4′-tert.butyl-3′-hydroxy-2′,6′-dimethylphenyl) - 1-methylpropyl]-N-methyl-N-(1-methyl-3,3 - diphenylpropyl)-amine-hydrochloride (racemate I). The analogous racemate II which is obtained in a similar manner can be recrystallized as the hydrochloride from benzene and petroleum ether, and melts with decomposition at 132–135° C.

*Example 31*

29.1 g. N,N - diethyl-α-(4-tert.butyl-3-hydroxy-2,6-dimethylphenyl)-acetamide, (produced by saponifying 4-tert.butyl-3-hydroxy-2,6-dimethyl-benzylcyanide to 4-tert.butyl - 3 - hydroxy-2,6-dimethyl-phenyl-acetic acid, M.P. 168–169° C., which is treated with thionyl chloride and the acid chloride, and then reacted with diethylamine) are dissolved in 150 ml. absolute tetrahydrofuran and during cooling with ice are added dropwise to a suspension of 12 g. LiAlH$_4$ in 300 ml. absolute tetrahydrofuran. The reaction mixture is then boiled 7 hours under reflux. After decomposition of the excess LiAlH$_4$ with water-containing tetrahydrofuran, the mixture is poured upon 2.5 liters of ice water, is acidified with an excess of 25% hydrochloric acid, and is extracted with ether. The aqueous acid solution is reacted with 50 g. tartaric acid, is stirred into a large excess of ice cold concentrated NaOH solution, and the alkaline solution is extracted with ether. The basic compounds thus obtained are recrystallized from petroleum/ether. The yield is 8 g. N,N-diethyl-4-tert.butyl - 3-hydroxy-2,6-dimethyl-phenethylamine, M.P. 100–102° C.

*Example 32*

By analogy to Example 24, from 3-(4′-tert.butyl-3′-hydroxy - 2′,6′ - dimethylphenyl) - 1 - methyl - N - (1 - methyl-3,3-diphenylpropyl)-propylamine (racemate I) by reaction with propionic anhydride and subsequent reduction with LiAlH$_4$, there is obtained N-[3-4′-tert.butyl-3′-hydroxy - 2′,6′ - dimethylphenyl) - 1 - methyl-propyl] - N - (1 - methyl - 3,3 - diphenyl - propyl) N -(n - propyl) - amine, which after conversion into the hydrochloride is recrystallized from benzene and petroleum ether or acetone. The salt melts at 166° C. After solidification it melts the second time at 221–223° C. with decomposition.

From the same starting materials, but by reaction with butyric anhydride and subsequent reduction with LiAlH$_4$, there is obtained N-[3-(4′-tert.butyl-3′-hydroxy-2′,6′-dimethylphenyl) - 1 - methyl - propyl] - N - (1 - methyl - 3,3-diphenyl-propyl)-N-(n-butyl)-amine.

*Example 33*

22.1 g. 4-tert.butyl-3-hydroxy-2,6-dimethylphenethylamine in 250 ml. methanol are reacted with 30 g. 35% formaldehyde solution and agitated 14 hours at 50° C. 2 g. PtO$_2$ catalyst are then added and the mixture is hydrogenated at room temperature and under normal pressure. The hydrogenated solution is acidified with 25% hydrochloric acid, is filtered, and concentrated. The yield is 22.5 g. of 4-tert.butyl-3-hydroxy-N,N,2,6-tetramethylphenethylamine-hydrochloride, which after recrystallization from alcohol-ether melts at 250–252° C.

By an analogous reaction, from 20.5 g. 4-tert.butyl-2,6-dimethyl-phenethylamine, there are obtained 21 g. of 4-tert.butyl - N,N,2,6-tetramethylphenethylamine - hydrochloride which melts at 275–278° C. with decomposition.

Example 34

45.7 g. of 3 - (4' - tert.butyl - 3' - hydroxy - 2'6' - dimethylphenyl) - 1 - methyl - N - (1 - methyl - 3,3 - diphenylpropyl)-propylamine (racemate I) are dissolved in 300 ml. xylene and refluxed in a vessel with water separator. 15.5 g. of diethyl sulfate and 10.1 g. of di-isopropylamine are added to the boiling solution which is refluxed for 2 hours. Subsequently, 7.8 g. of diethyl sulfate and 5.0 g. di-isopropylamine are added; after refluxing for another 2 hours, 7.8 g. of diethyl sulfate and 5.0 g. of di-isopropyl amine are added and the solution is refluxed for 3 hours. Upon every addition, some water is separated.

After being cooled, the xylene solution is separated from the insoluble material. The xylene is evaporated under reduced pressure and the residue is taken up with ether. The ethereal solution is washed with dilute sodium hydroxide and water and is dried and concentrated. The residue is dissolved in ethyl acetate. The solution is acidified with ethereal hydrogenchloride and is refluxed for some minutes. The N-ethyl-N-[3-(4'-tert.butyl-3'-hydroxy - 2',6' - dimethylphenyl) - 1 - methyl - propyl] - N - (1 - methyl - 3,3 - diphenylpropyl) - amine - hydrochloride crystallizes and is recrystallized from alcohol/ethyl acetate. M.P. 204–206° C.

Example 35

5 g. of N,O-di-acetyl-N-ethyl-4-tert.butyl-3-hydroxy-2,6-dimethylphenethylamine are refluxed for 5 hours with 100 ml. of 16% aqueous sodium hydroxide. The reaction mixture is diluted with twice the quantity of water and extracted with ether. The residue from the ethereal solution is worked up in the usual way and converted into the hydrochloride whereby 3.5 g. of N,N-diethyl-4-tert.butyl - 3 - hydroxy - 2,6 - dimethylphenethylamine - hydrochloride are obtained which are recrystallized from alcohol/ether. M.P. 263° C. (decomposition).

Example 36

5 g. of 3-acetoxy-N-ethyl-4-tert.butyl-N,2,6-trimethylphenethylamine-hydrochloride are refluxed for 5 hours in 150 ml. of methanolic KOH (10%). The reaction mixture is diluted with ice water. The base is isolated in the usual way by extraction with ether and converted into the hydrochloride. 4.0 g. of N-ethyl-4-tert.butyl-3-hydroxy - N,2,6 - trimethylphenethylamine - hydrochloride are obtained melting at 225–227° C. upon recrystallization from alcohol/ether.

Example 37

22.1 g. of γ-(3-tert.butyl-4-hydroxy-5-methylphenyl)-propylamine are dissolved in 400 ml. of methanol and hydrogenated under about 6 atm. at 60° C. in the presence of 17.2 g. of 35% formaldehyde and 2 g. of PtO₂. The catalyst is filtered off and the solution is evaporated. The crude base is recrystallized from petroleum ether and from ethyl acetate. M.P. of the N,N-dimethyl-N-[3-(3' - tert. - butyl - 4' - hydroxy - 5' - methylphenyl) - propyl]-amine 86–88° C.

*Preparation of the starting material.*—2-methyl-6-tert.butyl-phenol is reacted in the usual way with N-methyl formanilide to form 3-tert.butyl-4-hydroxy-5-methyl-benzaldehyde which upon reaction with cyanacetic acid yields the correspondingly substituted cinnamic acid nitrile. Reduction with Raney Ni results in the formation of γ - (3 - tert.butyl - 4-hydroxy-5-methylphenyl)-propyl-amine, M.P. 135–136° C.

Example 38

52.6 g. of γ-(3,5-di-tert.butyl-4-hydroxy-phenyl)-propylamine are dissolved in 500 ml. of ethanol and hydrogenated under about 3 atm. at 60° C. in the presence of 100 g. of 35% formaldehyde and 5 g. of PtO₂. The catalyst is filtered off and the solution is evaporated. The crude base (53 g.) is taken up with ether and converted into the hydrochloride by addition of ethereal hydrogen chloride. Upon recrystallization from alcohol, the N,N-dimethyl-N-[3-(3',5'-di - tert.butyl - 4' - hydroxyphenyl)-propyl]-amine-hydrochloride melts at 178–181° C.

The base obtained from the hydrochloride in the usual way melts at 31–33° C.

The starting material is obtained from 2,6-di-tert.butyl-phenol as indicated in Example 37.

Example 39

8.6 g. of (3-tert.butyl-4-hydroxy-5-methylbenzyl)-methyl-ketone are dissolved in 200 ml. of ethanol and hydrogenated under 115 atm. and at 130° C. in the presence of 10 g. of ethyl amine and 5 g. of Raney Ni. The catalyst is filtered off and the solution is evaporated. The oily residue is treated with 50 ml. of dilute hydrochloric acid and extracted with ether. The aqueous layer is made alkaline and extracted with ether. The combined ether extracts are dried with sodium sulfate and evaporated. 6.8 g. of oily 2-ethylamino-1-(3'-tert.butyl-4'-hydroxy-5'-methylphenyl)-propane are obtained which are converted into the hydrogen-fumarate by addition of the calculated amount of fumaric acid in 30 ml. of absolute ethanol. M.P. 205–208° C.

The base may be obtained from the salt in the usual manner. It is recrystallized from cyclohexane/petroleum ether. M.P. 100–102° C.

*Preparation of the starting material.*—2-methyl-6-tert.butyl-phenol is reacted with propionyl chloride. The phenol ester thus obtained is saponified to form 3-tert.butyl-4-hydroxy-5-methyl-propiophenone, M.P. 130–132° C. Reaction with bromine results in the formation of α-bromo-3-tert.butyl-4-hydroxy - 5 - methyl - propiophenone which yields in a known manner the correspondingly substituted α-amino ketone. This one is hydrogenated to form the corresponding amino ethanol which is reacted with phosphorous oxychloride whereby the (3-tert.butyl-4-hydroxy - 5 - methylbenzyl) - methyl - ketone is obtained. M.P. 91–93° C.

Example 40

11.2 g. of 4 - tert.butyl-3-hydroxy-2,6-dimethylbenzyl-cyanide in 40 ml. of methanol are hydrogenated in the presence of 10 g. of 10% Pd-coal and 15 g. of ethyl amine under about 6 atm. at 75° C. The catalyst is filtered off. The solution is evaporated under reduced pressure. The residue is dissolved in 60 ml. of ether; 150 ml. of 10% hydrochloric acid are added whereby the N-ethyl-4-tert.-butyl-3-hydroxy-2,6-dimethylphenethylamine - hydrochloride is precipitated. Upon recrystallization from methanol/ether, 10 g. of this product having a M.P. of 266–268° C. (decomp.) are obtained.

Example 41

According to the method described in Example 4(a), 4-tert.butyl-3-hydroxy-2,6-dimethylphenethylamine is reacted with 4,4-bis-(para-tert.butyl-phenyl)-butane-2-one to form 4 - tert.butyl-3-hydroxy-2,6-dimethyl-N-[3,3-bis-(para-tert.butyl-phenyl)-1-methylpropyl]-phenethylamine.

The butanone used as starting material is obtained by reaction of para-tert.butyl-benzaldehyde with acetone and subsequent addition of tert.butylbenzene to the substituted benzalacetone. Kp. 140–143° C./0.01 mm. Hg.

Example 42

According to the method described in Example 22, the N-(4-tert.butyl-3-hydroxy-2,6-dimethylphenethyl)-N-[3,3-bis-(para-tert.butyl-phenyl)-1-methylpropyl] - N - methylamine is obtained from 4-tert.butyl-3-hydroxy-2,6-dimethyl-N-[3,3 - bis-(para - tert.butyl-phenyl)-1-methylpropyl]-phenethylamine.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound selected from the group consisting of an amine of the formula:

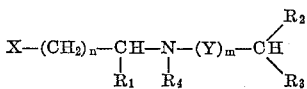

and the acid addition salts thereof, wherein $R_1$ is selected from the group consisting of hydrogen, methyl and ethyl;
$R_2$ is selected from the group consisting of hydrogen, phenyl and X;
$R_3$ is selected from the group consisting of phenoxy, hydrogen, phenyl, and X;
$R_4$ is selected from the group consisting of hydrogen, alkyl of 1–4 carbon atoms and hydroxyalkyl of 1–4 carbon atoms;
X is a substituted phenyl radical of the formula:

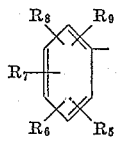

$R_5$ is a tertiary alkyl group of 4–6 carbon atoms;
$R_6$ is selected from the group consisting of hydrogen and a tertiary alkyl group of 4–6 carbon atoms;
$R_7$ and $R_8$ are each selected from the group consisting of hydrogen and a primary alkyl of 1–4 carbon atoms;
$R_9$ is selected from the group consisting of hydrogen and hydroxy, with the provision that when $R_9$ is hydroxy it is in other than the 2- or 6-position, and at least one of $R_6$, $R_7$ and $R_8$ is other than hydrogen;

Y is an alkylene group of 1–3 carbon atoms;
$m$ is an integer from 0 to 1 inclusive; and
$n$ is an integer from 1 to 3 inclusive, with the provision that the group $(CH_2)_n$—$CHR_1$, contains less than 5 carbon atoms in total.

2. N - propyl - 3 - (3',5' - di - tert.butyl - 4' - hydroxyphenyl)-propylamine.

3. N - (3' - phenylpropyl - 3 - (3'',5'' - di - tert.butyl-4''-hydroxyphenyl)-propylamine.

4. 4 - tert.butyl - 3 - hydroxy - N,N,2,6 - tetramethyl-phenethylamine.

5. N - ethyl - 4 - tert.butyl - 3 - hydroxy - N,2,6 - trimethyl-phenethylamine.

6. 2 - (4' - tert.butyl - 3' - hydroxy - 2',6' - dimethyl-phenyl)-N,N,1-trimethyl-ethylamine.

7. 3 - (4' - tert.butyl - 3' - hydroxy - 2',6' - dimethyl-phenyl)-N,N,1-trimethyl propylamine.

8. N - [3 - (4' - tert.butyl - 2',6' - dimethylphenyl) - 1-methyl - propyl] - N - methyl - N - (1 - methyl - 3,3 - diphenylpropyl)-amine.

9. 4 - tert.amyl - 3 - hydroxy - N,N,2,6 - tetramethyl-phenethylamine.

10. N - ethyl - 4 - tert.amyl - 3 - hydroxy - N,2,6 - trimethyl-phenethylamine.

11. N - ethyl - 2 - (4' - tert.butyl - 3' - hydroxy - 2',6'-dimethylphenyl)-N,1-dimethyl-ethylamine.

12. N - ethyl - N - [3 - (4' - tert.butyl - 3' - hydroxy-2',6' - dimethylphenyl) - 1 - methyl - propyl] - N - (1-methyl-3,3-diphenylpropyl)-amine-hydrochloride.

13. N - methyl - N - propyl - 3 - (3',5' - di - tert.butyl-4'-hydroxyphenyl)-propylamine.

14. N - [3 - (4' - tert.butyl - 3' - hydroxy - 2',6' - dimethylphenyl) - 1 - methyl - propyl] - N - methyl - N-(1-methyl-3,3-diphenylpropyl)-amine-hydrochloride.

References Cited by the Examiner

UNITED STATES PATENTS

| | | | |
|---|---|---|---|
| 2,480,754 | 8/49 | McCarthy. | |
| 2,879,294 | 3/59 | Campbell | 260—570 |
| 2,892,753 | 6/59 | Schmidt et al. | 167—65 |
| 2,971,887 | 2/61 | Johnson | 167—65 |
| 3,116,330 | 12/63 | Krohs et al. | 260—570 |

CHARLES B. PARKER, *Primary Examiner.*

UNITED STATES PATENT OFFICE
CERTIFICATE OF CORRECTION

Patent No. 3,202,711

August 24, 1965

Wolfgang Fruhstorfer et al.

It is hereby certified that error appears in the above numbered patent requiring correction and that the said Letters Patent should read as corrected below.

Column 7, line 8, for "zine" read -- zinc --; column 9, line 26, for "start-" read -- starting --; line 28, for "Shiff's" read -- Schiff's --; line 67, for "opticially" read -- optically --; column 19, line 2, for "N,N,2,6-tetramethyl-phenethyl-" read -- 2,6-dimethyl-phenethyl- --; line 13, for "hydroxy," read -- hydroxy- --; lines 35 and 46, for "-diphenylpropyl-", each occurrence, read ---diphenylpropyl)- --; same column 19, lines 40, 61 and 63, for "tert,", each occurrence, read -- tert. --; line 58, for "-dimethylphenyl-" read -- -dimethylphenyl)- --; column 21, line 47, for "yl-1-methyl" read -- yl)-1-methyl --; column 22, line 54, for "N-[3-4′-" read -- N-[3-(4′- --.

Signed and sealed this 26th day of April 1966.

(SEAL)
Attest:

ERNEST W. SWIDER
Attesting Officer

EDWARD J. BRENNER
Commissioner of Patents